US008186328B2

(12) United States Patent
Kiemlen et al.

(10) Patent No.: US 8,186,328 B2
(45) Date of Patent: May 29, 2012

(54) COOLING MECHANISM

(75) Inventors: Ralf Kiemlen, Reutlingen (DE); Phillip Lang, Stuttgart (DE); Ralf Zink, Stuttgart (DE)

(73) Assignee: Mahle International GmbH (DE)

( * ) Notice: Subject to any disclaimer, the term of this patent is extended or adjusted under 35 U.S.C. 154(b) by 516 days.

(21) Appl. No.: 12/497,147

(22) Filed: Jul. 2, 2009

(65) Prior Publication Data

US 2010/0000708 A1   Jan. 7, 2010

(30) Foreign Application Priority Data

Jul. 4, 2008  (DE) .................... 10 2008 031 684

(51) Int. Cl.
*F01M 5/00*       (2006.01)
(52) U.S. Cl. ............ 123/196 AB; 123/41.31; 123/41.33
(58) Field of Classification Search ............... 123/41.31, 123/41.33, 196 AB, 196 R
See application file for complete search history.

(56) References Cited

U.S. PATENT DOCUMENTS

| | | | | |
|---|---|---|---|---|
| 2,531,019 | A * | 11/1950 | Audet | 237/12.3 B |
| 4,167,969 | A * | 9/1979 | Ritzenthaler | 165/51 |
| 4,423,708 | A | 1/1984 | Sweetland | |
| 4,878,536 | A * | 11/1989 | Stenlund | 165/119 |
| 4,892,136 | A * | 1/1990 | Ichihara et al. | 165/51 |
| 5,351,664 | A * | 10/1994 | Rotter et al. | 123/196 AB |
| 5,363,823 | A * | 11/1994 | Gittlein | 123/196 AB |
| 5,896,834 | A | 4/1999 | Gruner | |
| 6,263,962 | B1 * | 7/2001 | Komoda et al. | 165/167 |
| 6,497,274 | B2 * | 12/2002 | Cheadle | 165/167 |
| 7,353,794 | B2 * | 4/2008 | Gruner et al. | 123/196 AB |
| 2005/0205236 | A1 | 9/2005 | Kalbacher et al. | |

FOREIGN PATENT DOCUMENTS

| | | |
|---|---|---|
| DE | 3248395 | 7/1983 |
| DE | 19626867 | 1/1998 |
| DE | 10040669 | 2/2002 |
| DE | 102004040892 | 3/2006 |
| DE | 202004016183 | 3/2006 |
| DE | 102005052163 | 5/2007 |
| DE | 19654362 | 12/2007 |
| DE | 102006031608 | 1/2008 |

OTHER PUBLICATIONS

English abstract for DE-202004016183.
English abstract for DE-19626867.
English abstract for DE-102006031608.
English abstract for DE-102005052163.
English abstract for DE-102004040892.
English abstract for DE-10040669.
Klopfer, Martin, u.a., Olfiltermodule mit Volkunststoffolfilter in V6-u. V8-Dieselmotoren von Audi. In: MTZ, Jg.66, H. Oct. 2005, ISSN 0024/8525, S.768-774, Bilder 1,2,5.
German Search Report for DE-102008031684.9.

* cited by examiner

*Primary Examiner* — Noah Kamen
*Assistant Examiner* — Long T Tran
(74) *Attorney, Agent, or Firm* — Rader, Fishman, Grauer PLLC

(57) ABSTRACT

The present invention relates to a cooling mechanism (1), in particular for cooling oil in a motor vehicle, with a housing (2) having a bracket (3), by means of which housing (2) the cooling mechanism (1) is connected to an internal combustion engine, a transmission fluid cooler (10), and an engine oil cooler (7). Pertinent to the invention is that the cooling mechanism (1) is designed in a sandwich-type manner having an intermediate module (11) positioned between the engine oil cooler (7) and the transmission fluid cooler (10), which intermediate module (11) has at least one supply/removal assembly (12) that communicates with the engine oil cooler (7) and has corresponding supply/removal lines or connections.

20 Claims, 2 Drawing Sheets

COOLING MECHANISM

CROSS-REFERENCES TO RELATED APPLICATION

Figure 1:
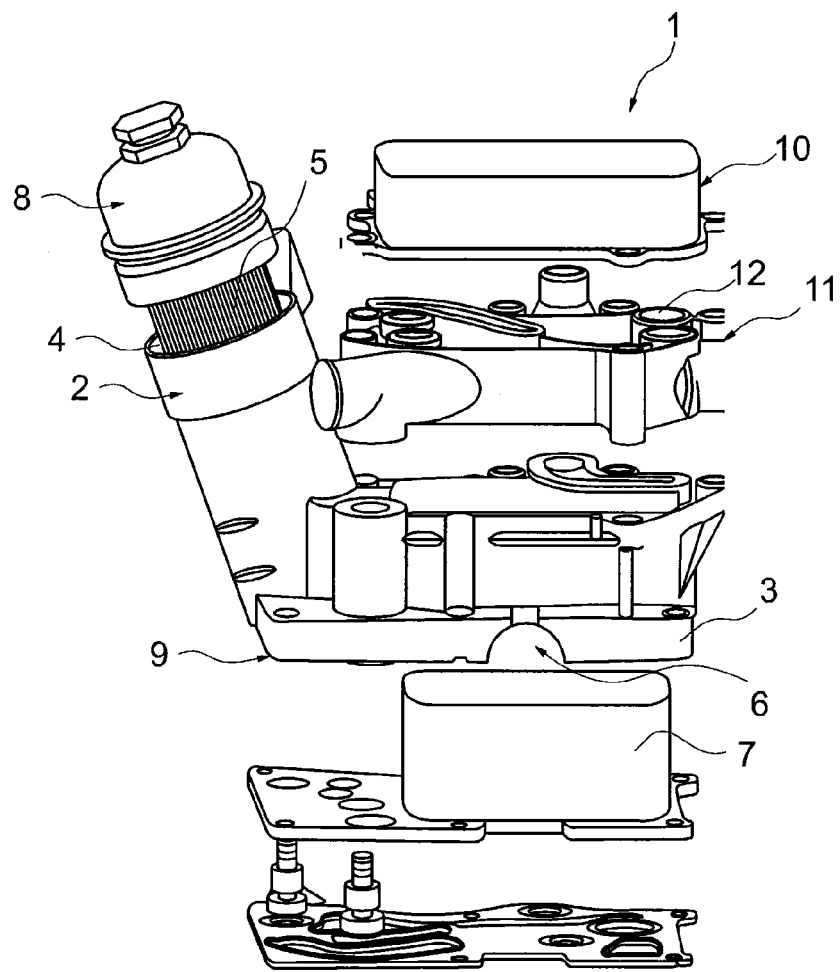

This application claims priority to German patent application DE 10 2008 031 684.9 filed on Jul. 4, 2008, which is hereby incorporated by reference in its entirety.

The present invention relates to a cooling mechanism, in particular for cooling oil in a motor vehicle, according to the preamble of claim 1. The invention moreover relates to a motor vehicle with an internal combustion engine having such a cooling mechanism.

In addition to direct cooling of an internal combustion engine by means of coolant, today's engines made for high performance often require additional components, such as engine oil and/or transmission fluid for cooling purposes. Cooling mechanisms are used in this instance, which cooling mechanisms are capable of cooling both the engine oil as well as the transmission fluid. Some of the cooling mechanisms are moreover able at the beginning of the driving operation to warm the engine oil by means of the coolant, which flows back heated by the internal combustion engine, thereby making it possible to reach operating temperature more quickly. During longer operation of the motor vehicle, this supplementary heating function is eliminated and a cooling of the transmission fluid occurs. However, a cooling mechanism having a transmission fluid cooler and an engine oil cooler requires a considerable amount of installation space that is conventionally tightly assessed in modern engine bays.

The present invention is concerned with the problem of providing an improved or at least a different embodiment of the cooling mechanism of the generic kind that is particularly characterised by a high degree of flexibility and by a minimal requirement for installation space.

This problem is solved according to the invention by the subject matter of the independent claims. Advantageous embodiments are the subject matter of the dependent claims.

The invention is based on a general idea of designing a cooling mechanism, in particular for cooling oil in a motor vehicle, in a substantially sandwich-type manner, namely with an engine oil cooler that is housed in a housing having a bracket, as well as a transmission fluid cooler, an intermediate module being provided between the engine oil cooler and the transmission fluid cooler, which module has at least one supply/removal assembly that communicates with the engine oil cooler and has corresponding supply and removal lines or connections. This offers the major advantage that an engine oil cooler, which is otherwise already required, can be incorporated in the housing, and a transmission fluid cooler can be provided optionally, that is to say only if necessary. If no transmission fluid cooler is desired, the openings of the supply/removal line provided in the intermediate module are correspondingly closed, whereas in a cooling mechanism with a transmission fluid cooler, said transmission fluid cooler can easily be flange-mounted on the intermediate module and thereby can be connected to the connections in a communicating manner, that is to say can be connected to the supply/removal lines in the intermediate module. In the cooling mechanism according to the invention, which cooling mechanism has an engine oil cooler and transmission fluid cooler, all supply/removal lines run in the housing as well as in the intermediate module in such a manner that an external line guidance, along with the high degree of assembly outlay associated therewith, can be dispensed with. Moreover, a cooling mechanism designed in such a manner offers, in comparison to conventional cooling mechanisms, the major advantage of having a far lower construction and thus requires considerably less installation space. Above all, with the intermediate module according to the invention, it is possible to use a housing designed in the same manner and to equip the cooling mechanism with only one engine oil cooler or with one engine oil cooler as well as transmission fluid cooler.

In an advantageous embodiment of the solution according to the invention, the intermediate module is designed as either separate or as an integral component of the housing. This is particularly advantageous in so far as additional functional elements can be provided in the housing, elements such as valve devices or thermostats, for example, that require a difficult and complex geometry of the supply/removal lines. With such difficult geometries in particular, it is advantageous to design the intermediate module separately from the housing in order to thereby be able to reduce the complexity of the injection moulding tools to be used. If such functional elements need not be provided, the intermediate module can theoretically be manufactured all in one piece with the housing, for example as an injection moulded part, through which a subsequent assembly of the intermediate module on the housing can be dispensed with.

In an additional advantageous embodiment of the solution according to the invention, the housing and the separate intermediate module are constructed of plastic. A construction of plastic, that is to say a fabrication of such a housing or of such an intermediate module in the injection moulding process makes possible, on the one hand, a very economical production method, particularly in the case of mass production, and, on the other hand, a shaping that can be selected nearly randomly and that can be adjusted, if required, by making simple alterations on the injection moulding tool.

A receptacle for a filter device is necessarily provided in the housing. A receiving shaft for a conventionally used ring filter element can thereby be provided, which element is inserted into the receiving shaft subsequent to which the receiving shaft is secured with a cap that is screwed on to its front face, thereby creating a sealed closure.

Integrating such a receptacle into the housing of the cooling mechanism offers the major advantage that the filter device need not be separately constructed, resulting in both a reduction in production costs as well as a reduction in the installation space required therefor.

Additional important features and advantages of the invention can be found in the dependent claims, in the drawings, and in the pertinent description of the figures with reference to the drawings.

It is understood that the features described above and those to be described in what follows can be used not only in the particular cited combination; but also in other combinations or independently without departing from the scope of the present invention.

Preferred embodiments of the invention are shown in the drawings and are described in more detail in the following description, the same reference numerals referring to components which are the same or functionally the same or similar.

Figure 2:
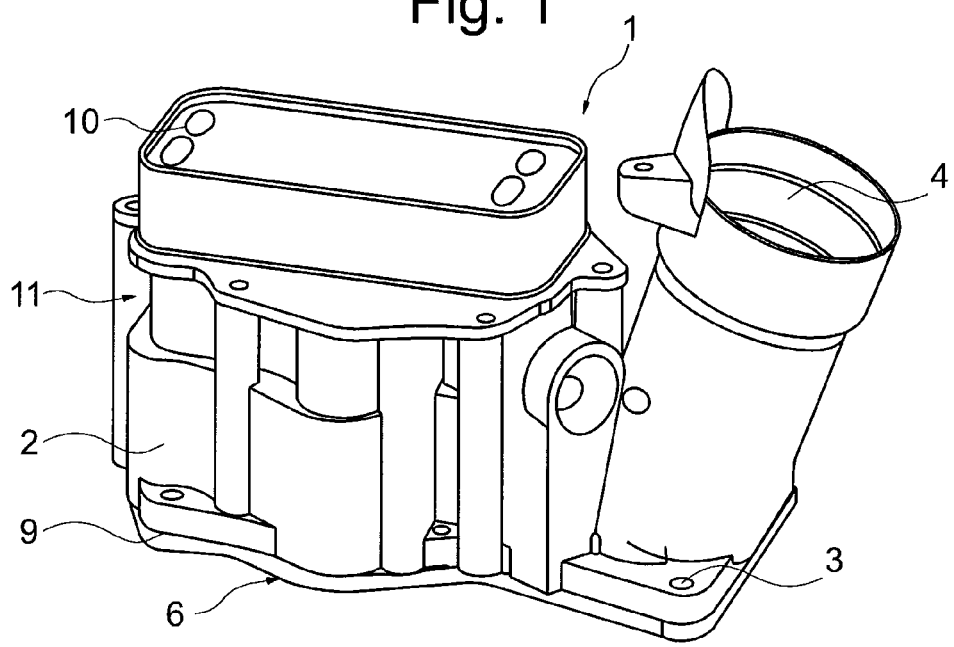
Figure 3:
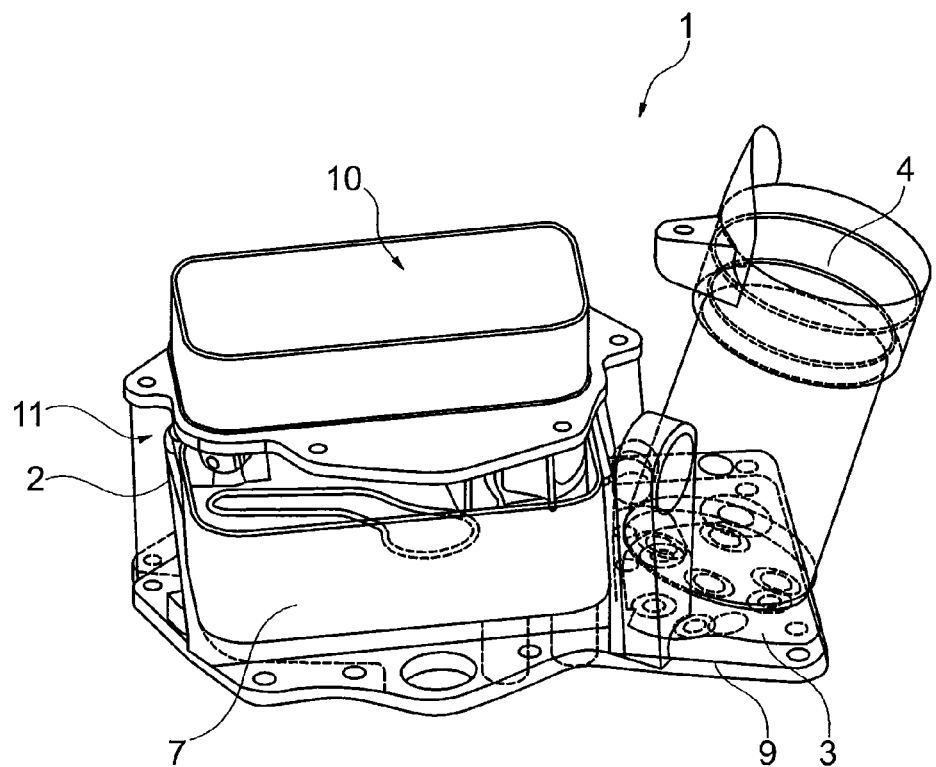
Figure 4:
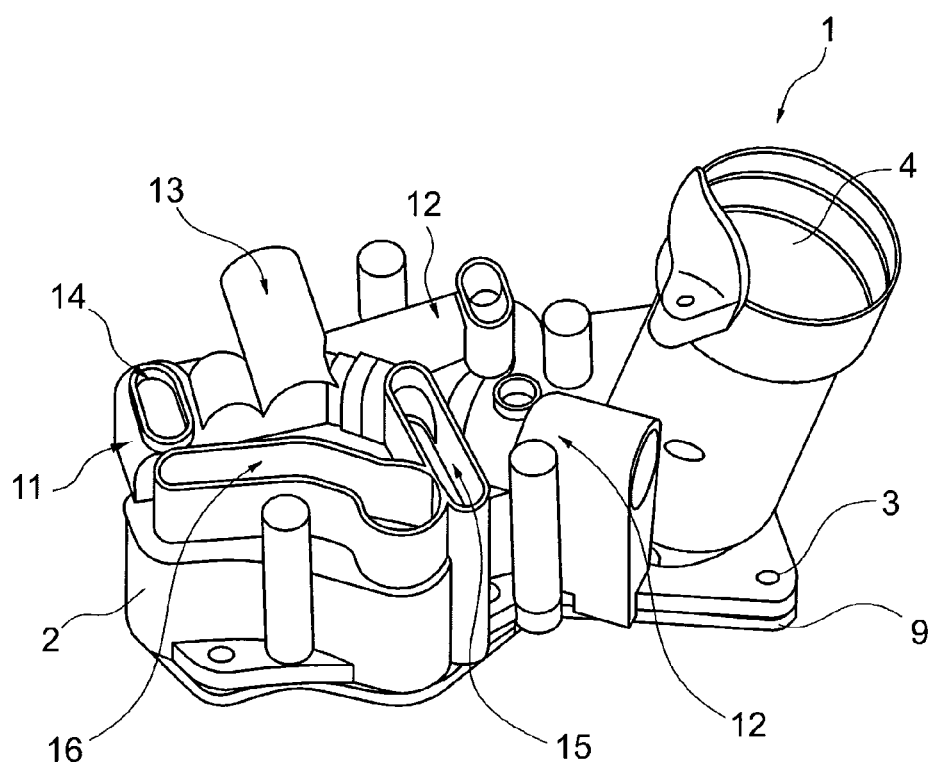

FIG. 1 schematically shows an exploded view of a first embodiment of a cooling mechanism according to the invention;

FIG. 2 schematically shows the cooling mechanism according to the invention in a second embodiment;

FIG. 3 schematically shows a view as in FIG. 2, however with a partially transparent housing;

FIG. 4 schematically shows a view as in FIG. 2, however with the transmission fluid cooler removed.

Corresponding to FIG. 1, a cooling mechanism 1 according to the invention, particularly designed for cooling oil in a motor vehicle, has a housing 2. The housing 2 can be connected to an engine block, which is not shown, by means of a bracket 3 and moreover optionally has a receptacle 4 for a filter device 5 as well as a receptacle 6 for receiving an engine oil cooler 7. The filter device 5 can be designed in the form of a ring filter element and is held in the receptacle 4 by means of a screw closure in the known manner. The housing is insulated from a plate of the engine oil cooler 7 by a sealing 9. Moreover, a transmission fluid cooler 10 is provided that can be connected to the housing 2 by means of an intermediate module 11. The cooling mechanism 1 is thus designed according to the invention in a sandwich-like manner with the intermediate module 11, which is positioned between the engine oil cooler 7, on the one hand, and the transmission fluid cooler 10 on the other, having one supply/removal assembly 12 that communicates with at least the engine oil cooler 7 and, in this instance, also with the transmission fluid cooler 10, which assembly has corresponding supply/removal lines or connections. The supply/removal assembly 12 constructed in the intermediate module 11 is adjusted to the corresponding connections of the housing 2 or of the transmission fluid cooler 10 in such a manner that when the transmission fluid cooler 10 is clamped together with the intermediate module 11 and the housing 2, a communicating and simultaneously sealed line connection results.

The cooling mechanism 1 according to the invention has the major advantage that all supply and removal lines run inside the housing 2 or inside the intermediate module 11 in such a manner that an external and complicated line guidance is not necessary. It goes without saying that corresponding sealing surfaces are provided on the supply/removal assembly 12 by means of which a sealed connection of the supply and removal lines can be guaranteed in the sandwich-like compressing of the transmission fluid coolers 10 with the intermediate module 11 and the housing 2.

In the embodiment shown in FIG. 1, the intermediate module 11 has been constructed separately, it also being conceivable that it forms an integral component of the housing 2, as shown in FIGS. 2 to 4.

In order to design both the intermediate module 11 as well as the housing 2 in an economical manner that is also flexible in terms of its configuration, the material used for the housing 2 and the intermediate module 11 is conventionally plastic, thereby making it possible for both components to be manufactured by an injection moulding process, for example. In addition to the above-mentioned supply and removal assembly 12, additional functional elements, such as a thermostat or a valve device, for example, can be integrated into the intermediate module 11. Owing to such an integration, these functional elements likewise need not be separately installed in future, but rather are located in a protected location within the intermediate module 11.

Yet another important advantage of the cooling mechanism 1 according to the invention is that the transmission fluid cooler 10 is only optionally provided, meaning that the cooling mechanism 1 can also be installed with the engine oil cooler 7 only. In this case, the corresponding supply and removal lines on the intermediate module 11 that lead into the periphery are to be sealed or correspondingly communicating connections are to be created. For example, suitable sealing plugs, which are not shown, can be provided.

A sealed clamping of the transmission fluid cooler 10 to the intermediate module 11 and the housing 2 can be achieved by way of suitable screws, for example, that can be screwed into screw-in openings that are in the housing and provided therefor. Additional inserts, for example, can be provided in the screw-in openings in order to increase the fixing in position.

In the instance of an intermediate module 11 integrated in the housing 2, these screw-in openings can of course be provided in the region of the intermediate module 11, as it is designed as part of the housing 2 anyway.

It is likewise possible with the cooling mechanism 1 according to the invention to control a cooling circuit of the transmission fluid cooler 10 and a cooling circuit of the engine transmission 7 either together or separately by means of a suitable valve device that, for example, may be arranged in the intermediate module 11. The valve device can also serve to connect the two cooling circuits or separate them from one another. In particular, during a start phase of the motor vehicle, for example, coolant from the internal combustion engine can be conducted through the transmission fluid cooler 10 and/or through the engine oil cooler 7 in order to thereby achieve a more rapid heating of the transmission fluid or the engine oil. After reaching the operating temperature, the cooling current can be diverted by the valve device so as to henceforth cool the transmission fluid or the engine oil.

It is particularly advantageous in the cooling mechanism 1 according to the invention that it creates a very favourable package appeal owing to its sandwich-type construction that minimises installation space.

FIG. 4 shows the plurality of the supply/removal lines arranged in the intermediate module. A few examples that can be seen are a transmission fluid inlet 13, a transmission fluid outlet 14, a coolant channel 15, a water runback 16 as well as additional functional elements such as a thermostat receptacle 17.

The invention claimed is:

1. A cooling mechanism, comprising:
    a housing having a bracket, by means of which housing the cooling mechanism is connected to an internal combustion engine, a transmission fluid cooler, and an engine oil cooler, and
    an intermediate module;
    wherein the cooling mechanism is designed in a sandwich-type configuration having the intermediate module positioned between the engine oil cooler and the transmission fluid cooler, wherein the intermediate module has at least one supply/removal assembly that communicates with the engine oil cooler and has one of corresponding supply/removal lines and connections.

2. The cooling mechanism as specified in claim 1, wherein the intermediate module is designed as one of separately and as an integral component of the housing.

3. The cooling mechanism as specified in claim 1, wherein the housing and the intermediate module are composed at least in part of plastic.

4. The cooling mechanism as specified in claim 1, wherein a receptacle for a filter device is provided in the housing.

5. The cooling mechanism as specified in claim 1, wherein at least one thermostat device is arranged in the intermediate module.

6. The cooling mechanism as specified in claim 1, wherein screw-in openings are provided in the area of the housing in which one of the transmission fluid cooler alone when the intermediate module is integrated with the housing and the transmission fluid cooler together with a separately designed intermediate module is screwed in with fastening screws.

7. The cooling mechanism as specified in claim 1, wherein at least one additional functional element that is a valve device is integrated in the intermediate module.

8. The cooling mechanism as specified in claim 7, wherein at least one of the following is selected:

i. a coolant circuit of the transmission fluid cooler and a coolant circuit of the engine oil cooler are one of jointly and separately controllable by means of the valve device and
ii. wherein one of the following is selected:
   a. the valve device separates the coolant circuit of the transmission fluid cooler from the coolant circuit of the engine oil cooler, and
   b. said valve device connects the coolant circuit of the transmission fluid cooler from the coolant circuit of the engine oil cooler to one another.

9. The cooling mechanism as specified in claim 1, wherein the cooling mechanism is part of a motor vehicle.

10. The cooling mechanism as specified in claim 4, wherein the filter device is an oil filter.

11. The cooling mechanism as specified in claim 5, wherein the at least one thermostat device is an auxiliary thermostat.

12. The cooling mechanism as specified in claim 6, wherein that screw-in openings have corresponding inserts.

13. The cooling mechanism as specified in claim 2, wherein the housing and the intermediate module are composed at least in part of plastic.

14. The cooling mechanism as specified in claim 2, wherein a receptacle for a filter device is provided in the housing.

15. The cooling mechanism as specified in claim 2, wherein at least one thermostat device is arranged in the intermediate module.

16. The cooling mechanism as specified in claim 2, wherein screw-in openings are provided in the area of the housing in which one of the transmission fluid cooler alone when the intermediate module is integrated with the housing and the transmission fluid cooler together with a separately designed intermediate module is screwed in with fastening screws.

17. The cooling mechanism as specified in claim 16, wherein that screw-in openings have corresponding inserts.

18. The cooling mechanism as specified in claim 2, wherein at least one additional functional element that is a valve device is integrated in the intermediate module.

19. A cooling mechanism, comprising:
   a housing having a bracket, by means of which housing the cooling mechanism is connected to an internal combustion engine, and a transmission fluid cooler, and
   an intermediate module;
   wherein the cooling mechanism is designed in a sandwich-type configuration having the intermediate module positioned between the engine oil cooler and the transmission fluid cooler, wherein the intermediate module has at least one supply/removal assembly that is configured for communicating with an engine oil cooler and has one of corresponding supply/removal lines and connections.

20. The cooling mechanism as specified in claim 19, wherein at least one sealing element is provided that seals a corresponding opening in the intermediate module when no engine oil cooler is installed.

* * * * *